(No Model.)
C. LA DOW.
SULKY HARROW.
No. 312,476. Patented Feb. 17, 1885.
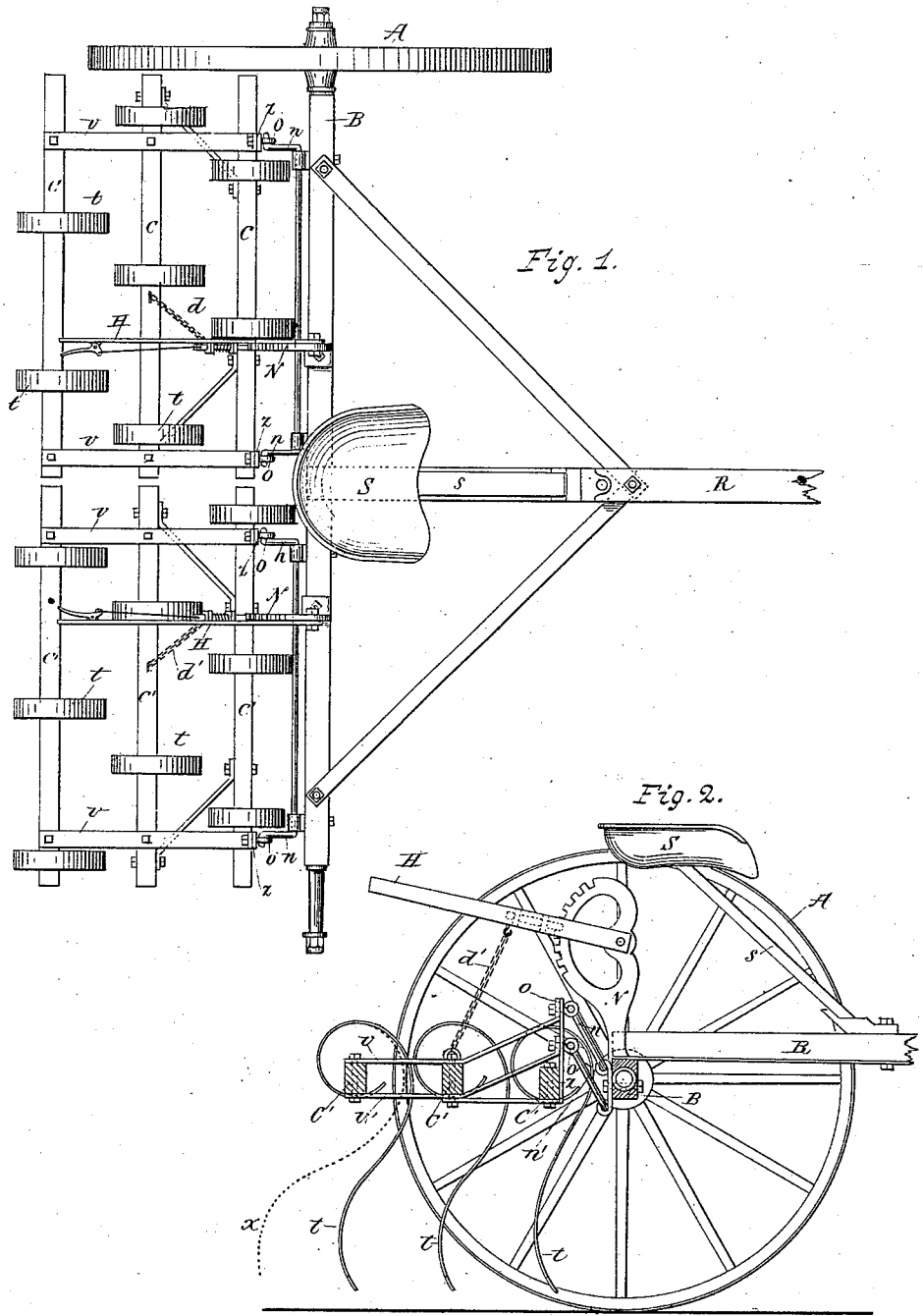
Witnesses:
J. A. Rutherford
Robert Everett
Charles La Dow,
Inventor
By James L. Norris,
Atty.

UNITED STATES PATENT OFFICE.

CHARLES LA DOW, OF ALBANY, NEW YORK.

SULKY-HARROW.

SPECIFICATION forming part of Letters Patent No. 312,476, dated February 17, 1885.

Application filed December 27, 1882. (No model.)

*To all whom it may concern:*

Be it known that I, CHARLES LA DOW, of the city and county of Albany, in the State of New York, have invented certain new and useful Improvements in Sulky-Harrows, of which the following is a specification.

This invention relates to improvements in that class of harrows which are provided with a frame carrying spring-teeth and hinged to a wheel-axle.

The objects of my invention are to provide novel means whereby the teeth are arranged in a series of ranks across the line of draft on separated tooth bars which can rise and fall without tilting; to provide novel means whereby a series of spring-teeth are carried by a frame which can rise and fall without tilting, and all the teeth extend equally and uniformly from the frame for enforcing the uniform penetration and vibration of all the teeth; and to provide novel means for supporting tooth-carrying bars and hinging them to an axle, whereby the bars can rise and fall without tilting for the purpose of moving the teeth-points simultaneously and maintaining them in the same horizontal plane during all degrees of their elevation or depression. The invention has other objects, which will hereinafter appear.

To such ends the invention consists in the combination of a wheeled axle, a frame comprising a series of separated tooth-bars, duplex hinges connecting said frame and axle, and spring-teeth mounted on the bars in a series of ranks across the line of draft, and each having a head circling in a volute curve around its tooth-bar, and all the teeth extending equally and uniformly from the tooth-bars for enforcing the uniform penetration and vibration of all the ranks of teeth when rising and falling.

The invention also consists in the combination of a wheeled axle, a frame comprising a series of separated tooth-bars, duplex hinges connecting the frame and axle, and vibratory spring-teeth secured to the bars in ranks across the line of draft, one rank for each bar, whereby the uniform penetration and vibration of all the ranks is enforced.

The invention also consists of other features, which will be hereinafter described and claimed.

In the accompanying drawings, Figure 1 represents a top view of the machine with nigh wheel removed. Fig. 2 represents a side elevation of the same, and they illustrate the parts of my improvement.

In the drawings, R is the tongue or pole. S and s are the seat and bar. B is the wheel-axle mounted on wheels, one of which is A.

C C C and C' C' C' are tooth-bars ranged in the same horizontal plane and parallel to the axle B, and bound together by cross-pieces above and below v v', and the angled bracket Z.

Mounted on the axle is shown one of the segmental racks, N, with lever H and dog, and the attachment d' of the lever to the tooth-frame, or, as in Fig. 1, to a section thereof, each section being provided with its lever and mechanism, as described.

Fig. 2 shows the contour of the edges of the teeth t t t, with the tooth-frame raised, as when lifting the teeth from the ground in case of an obstruction, and the dotted line x shows the outline of a tooth adjusted with less suction to the soil. Each tooth is shown mounted on the under side of a frame-beam and springing thence around over in front of its beam in a voluted curve.

Upon the axle B are mounted duplex hinges n n n' n', whose bent ends also hinge into eyebolts o o o' o', provided for them in the brackets Z of the frame, each section of the frame being similarly provided with a set of these hinges, so that each section may be operated independently of the other.

In carrying out my invention, upon the axle B with its wheels and tongue, I mount bearings for the yoke-arms of the duplex hinges to hinge in. The tooth-frame is made in sections, each of which is hinged to the axle B by means of the yoke-arms n n', which are arranged in pairs one above the other, and whose forward end portions play in the bearings on the axle, and whose rear ends terminate in hooks which play in the eyebolt-bearings o o' on the tooth-frame. These arms being formed in pairs and hinging in this manner, the tooth-frame is adapted to be raised or depressed without tilting, and its upper surface will be on a horizontal plane ranging parallel with the upper surface of the axle, and the forward facing side of the angled bracket Z will range always parallel or nearly parallel with the rear face of the axle. For each of the sections, two or more, into which the frame may be divided, I mount on the axle correspondingly a segmental rack, N, with lever H, and dog, and connect each lever with its frame-section, as at $d'$, Fig. 2, so that each section independently, by means of the duplex-hinged arms by which it is attached to the axle, may be raised or depressed and so held, with its upper surface ranging parallel with the upper surface of the axle and of the rest of the tooth-frame in any of the planes to which said section may be depressed or elevated. I construct the sections of the frame of tooth-beams running parallel to one another and to the axle at right angles to the line of draft, and suitably apart to allow proper play between them of the teeth mounted thereon, and bound together by plates and brackets, as shown at $v\ v'$ and Z, Fig. 2—that is to say, in each instance from the top of the rear beam a plate is extended across the top of the middle beam, and is then angled and extended to the vertical plate of the bracket Z, to which it is fastened with an eyebolt, $o$, and parallel to this plate is extended under these beams similarly another plate, fastened as at $c'$, and to these plates are fastened or bolted these rear beams. The vertical plate of the angled bracket Z is extended below its junction with the forward ends of the plate or straps above mentioned, $v\ v'$, and angled backward and fastened under the middle beam. Within the angle of the bracket Z the forward beam is fastened. This construction is employed at $v\ v\ v\ v$, Fig. 1, and by this means the beams are held rigidly in the same plane, one with the other, parallel and level, and the angled brackets serve as a brace to stiffen the frame in its parts horizontally, and to prevent the rear of the frame from sagging or wrenching either in its automatic operations over the ground or when it is operated by the lever. The bars or beams of the frame are also braced against side wrenching in turning the machine. On these beams I mount the teeth by means of friction-clamps bolted to the beams.

By this construction, obviously to the beams can be attached teeth having an equal extension, and which shall be in parallel rows, with no two teeth drawing in the same furrow, and which shall be elevated and depressed in unison with one another and with the frame, so that the teeth-points shall always be in the same horizontal plane whether they are penetrating the soil or are being held above it by being elevated with the frame. By this means, also, provision is made for mounting the teeth at suitable distances apart, so that they may spring from their respective beams and curve broadly forward and down without interfering with the other mechanisms in their vibrations, and so that they may be separately removed or adjusted. Obviously, also, the frame is so compacted in its rearward extent, and so braced that it will turn a land without undue wrenching, and will follow the wheels so closely as practically to take with the wheels those irregularities of the ground which the springing teeth would not otherwise naturally accommodate themselves to. By this means, also, the weight of the frame and teeth operate to hold the operative instrumentalities more uniformly to their work than if teeth of different lengths were mounted on a single beam, and the tendency of the hinge-gearing to work loose is also thus counteracted.

By hinging the duplex hinge-arms to the elevated forward end of the frame, the frame may be elevated so that its lower part will be raised to a level with the lower side of the axle, to clear any obstacle that could pass under the axle, while obviously by this means the frame may be depressed lower and the teeth intruded into the soil deeper than if the same hinge-arms were hinged lower down on the forward end of the frame and on a level with the plane of the frame-beams. Obviously, also, by means of the eyebolt devices with the duplex hinge-arms, a convenient mode is provided for detaching the parts so they can be readily packed for shipment, since the nuts can be readily loosened and the eyebolts withdrawn.

The teeth are preferably so arranged with reference to each other that no two shall cut in the same furrow, but that each one shall dodge the other. I mortise slots in the under side of the beams of the width of a tooth and of a depth nearly equal to the thickness of a tooth. I mount each tooth separately in one of these slots on the under side of the beam by means of a friction clamp or strap, which can be by means of bolts readily loosened or tightened over the tooth in the usual well-known way. I construct each tooth so that it shall pass between the clamp and the beam from front to rear, and then in a convoluted curve upward and forward over the beam, and thence downward, trending in an ogee with the lower part concave forward and the point which is to enter the soil directed forward. I construct the teeth of spring-steel. The almost circular upper part of the teeth gives greater range of vibratory or springing action to the teeth in encountering the soil, and so lessens the risk of breaking or wrenching the teeth under unusual strains, and the inwardly-protruding upper extremity of the tooth or the beam about which the tooth circles will afford the tooth support when forced, or spring backward by any excessive resistance of the soil. I construct the teeth so that they shall have equal and uniform extension from the frame, and by this means all the teeth-points will be raised or depressed uniformly in the same plane, which will be horizontal and elevated or depressed uniformly parallel with the plane to which the frame may be elevated or depressed.

By this construction and attachment of the teeth it is obvious that since the part of a tooth immediately below the frame is convex forward, the vibratory motion and backward spring of the tooth when operating will render the tooth effective to prevent any accumulation of refuse thereon and to discharge such clogging material as may strike against it, and the concave part of the tooth is so angled with the ground that when sprung backward in operating it acts like a dump to discharge anything that may accumulate thereon. Obviously, also, by circling the upper part of the teeth a vibratory effect is obtained in the upper part of the spring, the tendency of which is to lift the tooth vertically in a slight degree as it is operating, which, with the suction of the soil upon the teeth-points, tends to hold the teeth pressed into the soil, and at the same time to lift and shake or scatter it more effectively over the soil.

Obviously, teeth as described may be constructed without impairing their strength or durability; and also, obviously, teeth of different curvatures from the above description may be employed, and teeth might be employed clamped to the top or sides of the beams of the frame, but I prefer to use teeth constructed and clamped as described.

By means of the clamping devices and the curved spring-teeth, obviously the teeth, either singly or in rows, may be set so as to penetrate the soil at different angles—that is to say, with different degrees of suction to the soil—according to the nature of the soil to be harrowed, (vide *x*, Fig. 2,) without having to provide my machine with two or more sets of teeth having different curvatures.

The mode of operation of my improvement in sulky-harrows of the above class and the advantages attained by the organization of the mechanism herein recorded will be obvious to those skilled in the art from the foregoing description without further explanation.

I do not wish to be understood as broadly claiming a tooth-carrying frame connected with an axle by duplex hinges to rise and fall without tilting; nor as broadly claiming a spring-tooth circling around a tooth-bar; nor as broadly claiming parallel separated tooth-carrying bars; nor as broadly claiming spring-teeth adjustably held to a tooth-bar by friction-clamps. My invention comprises a new organization and combination of devices for providing a useful and efficient machine for working soil, all the parts comprising the structure coacting to produce the desired result. The separated tooth-bars permit several series of teeth to be used on a frame which can rise and fall without turning or tilting.

I claim as of my invention—

1. The combination of a wheeled axle, a frame comprising a series of separated tooth-bars, duplex hinges connecting said frame and axle, spring-teeth mounted on the bars in a series of ranks across the line of draft, and each having a head circling in a volute curve around its tooth-bar, and all the teeth extending equally and uniformly from the tooth-bars, said duplex hinges enforcing the uniform penetration and vibration of all the ranks of teeth when rising and falling, substantially as described.

2. The combination of a wheeled axle, a frame comprising a series of separated tooth-bars, duplex hinges connecting the frame and axle, and vibrating spring-teeth secured to the series of bars in ranks across the line of draft—one rank for each bar—said duplex hinges enforcing the uniform penetration and vibration of all the ranks of teeth when rising and falling, substantially as described.

3. The combination of the wheeled axle, the duplex hinges, the frame attached thereto, composed of tooth-bars separated from each other and connected by cross-bars, and a series of spring-teeth on each tooth-bar, substantially as described.

4. The combination, with a wheeled axle, of angled brackets hinged to the axle and adapted to move in a vertical plane without tilting, parallel separated tooth-bars carried by the brackets, a series of vibratory spring-teeth connected with each tooth-bar, and means for lifting all the tooth-bars simultaneously, substantially as described.

5. The combination, with a wheeled axle, of angled brackets hinged to the axle and adapted to stand horizontal when raised and lowered, and each carrying a series of parallel separated tooth-bars, and spring-teeth arranged on each bar so that those on one alternate with those on the adjacent bar, substantially as described.

6. The combination, with a wheeled axle, of a pair of brackets connected by a series of parallel separated tooth-bars, duplex hinges connecting the brackets with the axle, and a series of spring-teeth mounted on each bar, and having heads which circle in a volute curve, the teeth on one bar alternating with those on the adjacent bar, substantially as described.

7. The combination of a series of parallel tooth-bars, spring-teeth mounted thereon, and brackets connecting the bars and extended vertically above the forward bar, with the wheeled axle and duplex-hinged arms connecting the vertical extensions of the brackets with the axle, substantially as described.

8. The combination of the wheeled axle with the brackets having upper and lower sets of eyebolts, and provided with a series of separated tooth-carrying bars, and the duplex hinges having bent ends detachably secured in the eyebolts of the brackets.

In witness whereof I have hereunto set my hand in the presence of two subscribing witnesses.

CHARLES LA DOW.

Witnesses:
B. I. STANTON,
WM. W. DIAMOND.